(12) United States Patent
Mandel

(10) Patent No.: US 8,599,405 B2
(45) Date of Patent: Dec. 3, 2013

(54) SYSTEM AND METHOD FOR PRINTING QUEUED PRINT JOBS

(75) Inventor: Barry Paul Mandel, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1101 days.

(21) Appl. No.: 12/249,629

(22) Filed: Oct. 10, 2008

(65) Prior Publication Data

US 2010/0091319 A1    Apr. 15, 2010

(51) Int. Cl.
*G06F 3/12* (2006.01)

(52) U.S. Cl.
USPC ........... 358/1.15; 399/361; 399/382; 718/102

(58) Field of Classification Search
USPC .................. 358/1.15; 399/361, 382; 718/102
See application file for complete search history.

(56) References Cited

U.S. PATENT DOCUMENTS

| | | | |
|---|---|---|---|
| 4,941,170 A | 7/1990 | Herbst | |
| 5,719,960 A | 2/1998 | Melen | |
| 5,978,559 A * | 11/1999 | Quinion | 358/1.15 |
| 6,791,703 B1 * | 9/2004 | Maeda et al. | 358/1.15 |
| 7,072,066 B2 * | 7/2006 | Guddanti | 358/1.15 |
| 7,081,969 B1 | 7/2006 | Motamed et al. | |
| 7,113,959 B1 * | 9/2006 | Klatt et al. | 705/7.21 |
| 7,656,547 B2 * | 2/2010 | Kuo et al. | 358/1.15 |
| 7,787,138 B2 * | 8/2010 | Lofthus et al. | 358/1.15 |
| 7,818,285 B1 * | 10/2010 | Klatt et al. | 707/600 |
| 8,117,617 B2 * | 2/2012 | Fernstrom et al. | 718/102 |
| 2002/0016921 A1 * | 2/2002 | Olsen et al. | 713/200 |
| 2003/0086115 A1 * | 5/2003 | Bhatti | 358/1.15 |
| 2004/0165211 A1 * | 8/2004 | Herrmann et al. | 358/1.15 |
| 2004/0184071 A1 * | 9/2004 | Garg et al. | 358/1.15 |
| 2004/0185877 A1 | 9/2004 | Asthana et al. | |
| 2004/0190057 A1 * | 9/2004 | Takahashi et al. | 358/1.15 |
| 2005/0268299 A1 * | 12/2005 | Picinich et al. | 718/100 |
| 2005/0275868 A1 * | 12/2005 | Higashiura et al. | 358/1.14 |
| 2006/0033958 A1 * | 2/2006 | d'Entrecasteaux | 358/1.16 |
| 2006/0045596 A1 * | 3/2006 | Tischler | 400/76 |
| 2006/0053481 A1 * | 3/2006 | Olsen et al. | 726/3 |
| 2006/0075337 A1 * | 4/2006 | Jones et al. | 715/530 |
| 2006/0156229 A1 * | 7/2006 | Morgan | 715/527 |
| 2006/0184944 A1 * | 8/2006 | Schwerk | 718/101 |
| 2006/0227368 A1 * | 10/2006 | Hong | 358/1.15 |
| 2007/0044099 A1 * | 2/2007 | Rajput | 718/102 |
| 2007/0279646 A1 | 12/2007 | Sugimoto et al. | |
| 2008/0080003 A1 * | 4/2008 | Ferlitsch et al. | 358/1.16 |
| 2008/0080006 A1 * | 4/2008 | Paskalev et al. | 358/1.18 |
| 2008/0170254 A1 * | 7/2008 | Shah | 358/1.15 |
| 2008/0176547 A1 * | 7/2008 | Paul et al. | 455/418 |
| 2009/0153905 A1 * | 6/2009 | Cyman et al. | 358/1.18 |
| 2009/0201528 A1 * | 8/2009 | Truong | 358/1.15 |
| 2010/0091318 A1 * | 4/2010 | Ferlitsch | 358/1.15 |
| 2011/0149335 A1 * | 6/2011 | Nichols et al. | 358/1.15 |

* cited by examiner

*Primary Examiner* — Benjamin O Dulaney
(74) *Attorney, Agent, or Firm* — Fay Sharpe LLP

(57) ABSTRACT

A system for printing queued print jobs includes a user interface and a job submission component. The user interface communicates user input. The job submission component submits print jobs to at least one print queue. The job submission component communicates with the user interface to receive the user input therefrom. The job submission component includes at least one parameter associated with printing an identification sheet with all of the at least one print job in the at least one print queue when a predetermined condition occurs, the predetermined condition includes at least one of a temporal condition, a periodic temporal condition, a threshold number of pages, and a threshold number of print jobs in the at least one print queue.

17 Claims, 4 Drawing Sheets

SYSTEM AND METHOD FOR PRINTING QUEUED PRINT JOBS

BACKGROUND

1. Technical Field

The present disclosure relates to printing systems, and in particular, to a system and method for printing queued print jobs, e.g., printing queued print jobs on shared network printers such that the number of banner or identification sheets used to identify the printed jobs may be reduced.

2. Background of Related Art

Modern computing environments include multiple computer devices which are networked (e.g., personal computers, printing systems, scanner, faxes and the like). For example, several computers may be linked together via a LAN utilizing TCP/IP and/or other protocols. Additionally, the LAN environment may include servers for controlling access to the LAN by utilizing authentication and verification systems. Printing may be centrally located for convenience to the users logged onto the system. These centrally located printing systems enable the LAN administrators to buy a high-volume, high-speed printing system thereby resulting in lower per-page printing costs. The word "printing system" as used herein encompasses any apparatus, such as a digital copier, printer, bookmaking machine, facsimile machine, multi-function machine, etc. which performs a print outputting function for any purpose.

Some LAN configurations are very large in size and can span several physically separated spaces. Some of these large networked systems are commonly referred to as WANs ("Wide Area Network"). WANs are similar to LANs, however, WANs generally have multiple physical locations in several metropolitan, regional or national locations. Because of the large scale of some of these networks, several printing system are sometimes located in a single location and/or groups of printing systems are located in physically separate localities. For example, a college campus may include computer labs for students and computer labs for faculty members. Each of these locations may include one or more printing systems. Additionally, in this example, a printing system may be located in an adjacent building where some faculty members are located or where additional classes are held.

Because of the various locations that media may be printed within a network, print drivers generally give the user the option of where to print. Print drivers sometimes perform some processing on the print data for printing and thereafter transfer the processed print data from the personal computer to a print queue. Additionally or alternatively, the print driver may include an internal print queue.

Often several users attempt to print to the same printing system at about the same time. Print jobs are usually queued within a print queue and printed in a first-in first-out fashion. Each print job is commonly printed with a cover sheet indicating either the user's name and/or the print name of the document being printed. The cover sheet is usually one printed sheet having the same size and dimensions of the media used for printing the document itself. The cover sheet (or more generally "identification sheet") and print job are either printed immediately from the networked computer and/or are held at the printing system until a user "releases" the print job. Some current print drivers allow users to set a specific print time for a single job that they submit. This allows a very large print job to be printed after normal working hours, for example, but still requires an "identification sheet" for each job submitted.

SUMMARY

The present disclosure relates to printing systems, and in particular, to a system and method for printing queued print jobs, e.g., printing queued print jobs on shared network printers such that the number of banner or identification sheets used to identify the printed jobs may be reduced.

In one embodiment of the present disclosure, a system for queuing print jobs includes a user interface and a job submission component. The user interface communicates user input. The job submission component submits print jobs to a print queue. The job submission component communicates with the user interface and can receive the user input therefrom. The job submission component includes parameters associated with printing an identification sheet. The identification sheet is printed with the print jobs when a predetermined condition occurs. The predetermined condition may be one or more of a temporal condition, a periodic temporal condition, a threshold number of pages, and a threshold number of print jobs queued in the print queue. A single cover/banner/identification sheet may be used to identify the printed pages, jobs, documents and the like after the predetermined condition is reached thus reducing the total number of printed sheets relative to previous systems which print a separate cover/banner/identification sheet for each job.

In another embodiment according to the present disclosure, the at least one parameter has at least one default setting. The at least one default setting may be a function of a day of a week. Additionally or alternatively, the periodic temporal condition is based upon one or more of a day of the week, a date of a month and/or a time of a day.

In another embodiment of the present disclosure, the user input modifies the predetermined condition utilizing the user interface. The user input component may include a queue selection component adapted for user selection of a print queue from a plurality of print queues. The print queue may be one of an identification-based print queue, a group print queue, a project print queue, and an arbitrary print queue. The identification sheet has marked hereon one or more of a file name of a print job submitted to the print queue, a time stamp of the print queue, a date stamp of the print queue and a user name.

In another embodiment of the present disclosure, the user interface and/or the job submission component may be a print driver. Additionally or alternatively, the user interface may be a graphical user interface. The user interface may also include a user override selection component adapted for user selection of immediate printing of a print job.

In yet another embodiment of the present disclosure, a system for queuing print jobs includes a communications component and a print queue. The communications component receives user input and at least one print job. The print queue receives user input and the at least one print job from the communications component. The print queue includes at least one parameter associated with printing an identification sheet with all of the at least one print job when a predetermined condition occurs. The predetermined condition includes one or more of a temporal condition, a periodic temporal condition and/or a threshold number of pages or print jobs in the print queue. The system may be an installable module installable in a printing system. Additionally or alternatively, the system may be a printing system.

In yet another embodiment of the present disclosure, a method for queuing print jobs includes: communicating user input to a print queue; submitting at least one print job to a print queue; determining whether a predetermined condition occurs; and printing the at least one print job with an identification sheet when the predetermined condition occurs. The predetermined condition is one or more of a temporal condition, a periodic temporal condition and a threshold number of pages or print jobs in the print queue. The user input can modify the predetermined condition. The method may further include selecting the print queue from a plurality of print queues. The print queue may be an identification-base print queue, a group print queue, a project print queue, and an arbitrary print queue. The identification sheet has marked thereon one or more of a file name of a print job submitted to the print queue, a time stamp of the print queue, a date stamp of the print queue and/or a user name. Additionally or alternatively, the method may include overriding the predetermined condition thereby printing the at least one print job.

BRIEF DESCRIPTION OF THE DRAWINGS

These and other advantages will become more apparent from the following detailed description of the various embodiments of the present disclosure with reference to the drawings wherein.

DETAILED DESCRIPTION

Figure 1:
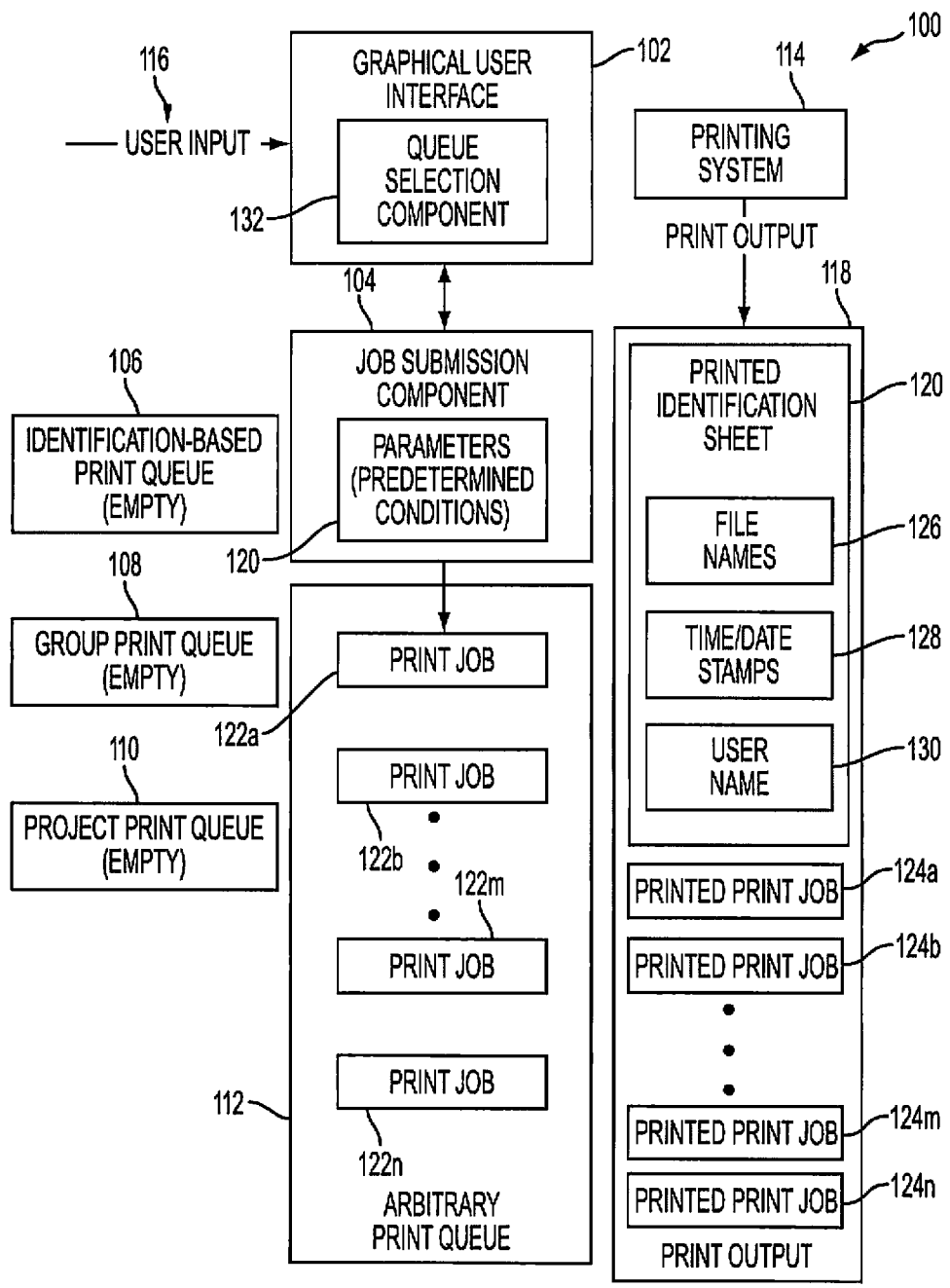
FIG. 1 is block diagram of a system for printing queued print jobs in accordance with the present disclosure.

Referring to the drawings, FIG. 1 is a block diagram of a system 100 for printing queued print jobs in accordance with the present disclosure. System 100 includes a graphical user interface 102, a job submission component 104 and print queues 106 through 112. System 100 may utilize printing system 114 and/or may be considered to be part of system 100 or separate therefrom. System 100 may be implemented by an operative set of processor executable instructions configured for execution by at least one processor (not explicitly depicted).

System 100 may be implemented (wholly or partially) in hardware, software, firmware, software in execution, bytecode, microcode, a virtual machine and the like. For example graphical user interface 102 may be implemented by an x86-processor based computer, a field-programmable gate array, a complex programmable logic device, programmable array logic and the like. Additionally or alternatively, one or more of graphical user interface 102, job submission component 104, print queues 106-112, and printing system 114 can be the implemented by the same computing device or separate computing devices. Any one of graphical user interface 102, job submission component 104, queues 106 through 112 and/or printing system 114 may include communications links to each other for communications, such as a network interface (e.g., a TCP/IP controller), an operating system communications interface such as Inter-Process Communications and/or Intra-process communications, an application programming interface, a wireless transceiver and the like. Additionally or alternatively, system 100 may be part of printing system 114, e.g., system 100 may be an installable module installable in printing system 114 and/or a PC in operative communication with printing system 114.

Graphical user interface 102 receives user input 116 from a user, e.g., a user at a networked PC terminal and the like. The user input 116 may include various types of data and/or instructions, such as instruction to modify parameters 120. User input 116 may be received by graphical user interface 102 via a dialog box, an operating system created object and the like. Although user input 116 is shown as being used by system 100, it is the purview of one of ordinary skill in the relevant art that other user input technologies may be used, e.g., console commands, scripts, system calls, driver interfaces, shells, command prompts, intra- or inter-process communications, thread communications, function calls and the like.

Printing system 114 prints print output 118. Parameters 120 are associated with conditions which results in printing system 114 printing print output 118 including a printed identification sheet 120. The print output 118 includes print jobs 122a-122n as printed, i.e., printed print jobs 124a-124n (the n denotes an arbitrary number). In other words, printed print jobs 124 correspond to queued print jobs 122, i.e., the printed print jobs 124 represent the print jobs 122 as printed by printing system 114.

A single sheet or grouping of sheets is used to identify the entirety of the queued print jobs as printed print jobs 124 rather than using a separate identification sheet 120 for each of printed print jobs when a predetermined condition occurs. For example, note that print jobs 122a through 122n are queued within print queue 112. One of the predetermined conditions as indicated by parameter 120 may be, for exemplary purposes only, a threshold number of print jobs queued in the print queue. In this example, suppose that the threshold number is five. When print queue 112 has five print jobs queued therein, print jobs 122a-122n are printed by printing system 114 (shown as printed print jobs 124a-124n) with a printed identification sheet 120. Printed identification sheet 120 includes file names 126, time/date stamps 128, and user name 130. File names 128 may be the name of the files used to generate the print data, e.g., the name of the word processing file used to generate print job 122a. Time/date stamps 128 may be the time and/or date the file was queued, printed, accessed and the like. User name 130 is the name of the user that submitted the print job. Printed identification sheet 120 may be in list form grouped by type, e.g., file names 126 are grouped together. Additionally or alternatively, printed identification sheet 120 may be grouped by print jobs, e.g., file names 126 includes the file name of printed print job 124a, followed by a time/date stamp of time/date stamps listing the time and date of printing of printed print jobs 124a, and followed by user name 130 that includes the user that printed print job 124a.

Another predetermined condition that can be associated with parameters 120, is a temporal condition. A temporal condition causes printing system 114 to print all of the print jobs in a print queue with an identification sheet based upon time, e.g., after a settable time-value has passed such as every four hours. A temporal condition may result in all of the queued print jobs to be printed at a certain time, such as at 4 p.m. Another predetermined condition that can be associated with parameters 120 is a periodic temporal condition. A periodic temporal condition is a condition is associated with a parameter that has a periodic component, e.g., print at 4 p.m. every Tuesday. Parameters 120 may control one or more predetermined conditions which can cause print output 118 to output all of the queued print jobs 122 as printed print jobs 124. Note that print output 118 includes printed identification sheet 120 for the entirety of printed print jobs 124. By using a single printed identification sheet 118 for the entirety of print output 118, rather than for each of printed print jobs 124, can reduce the overall paper usage.

As mentioned previously, user input 116 includes data to modify parameters 118, instructions or data relating to print jobs 118a through 118n. Additionally or alternatively, user input 116 communicates with queue selection component 132 to select a print queue of queues 106, 108, and 112. When a queue is selected, the print jobs are queued via job submission component 104 into the selected queue. A queue may be an identification-based print queue such as print queue 106. An identification-base print queue is a queue that is associated with the user. For example, an identification-based print queue may be associated with a username, a domain name, an ID number, a student number and the like. Group print queue 108 may be associated with a grouping of users or a grouping of identifications, e.g., everyone in a certain class or employees of an R&D group. Project print queue 110 is a queue based upon a common goal or common grouping, e.g., a certain work projects may use project print queue 110. Print queue 112 is an arbitrary print queue. Arbitrary print queue 112 is any print queue arbitrarily created. For example, arbitrary print queue 112 may be a number or arbitrary name, e.g., print queue 112 may be identified as "Jerry's print queue". Any one of print queues 106-116 may include access control, e.g., a user may authorize or deny other users or entities to queue jobs to one of print queues 106-116 and/or a passphrase may be required to access on of print queues 106-116.

Figure 2:
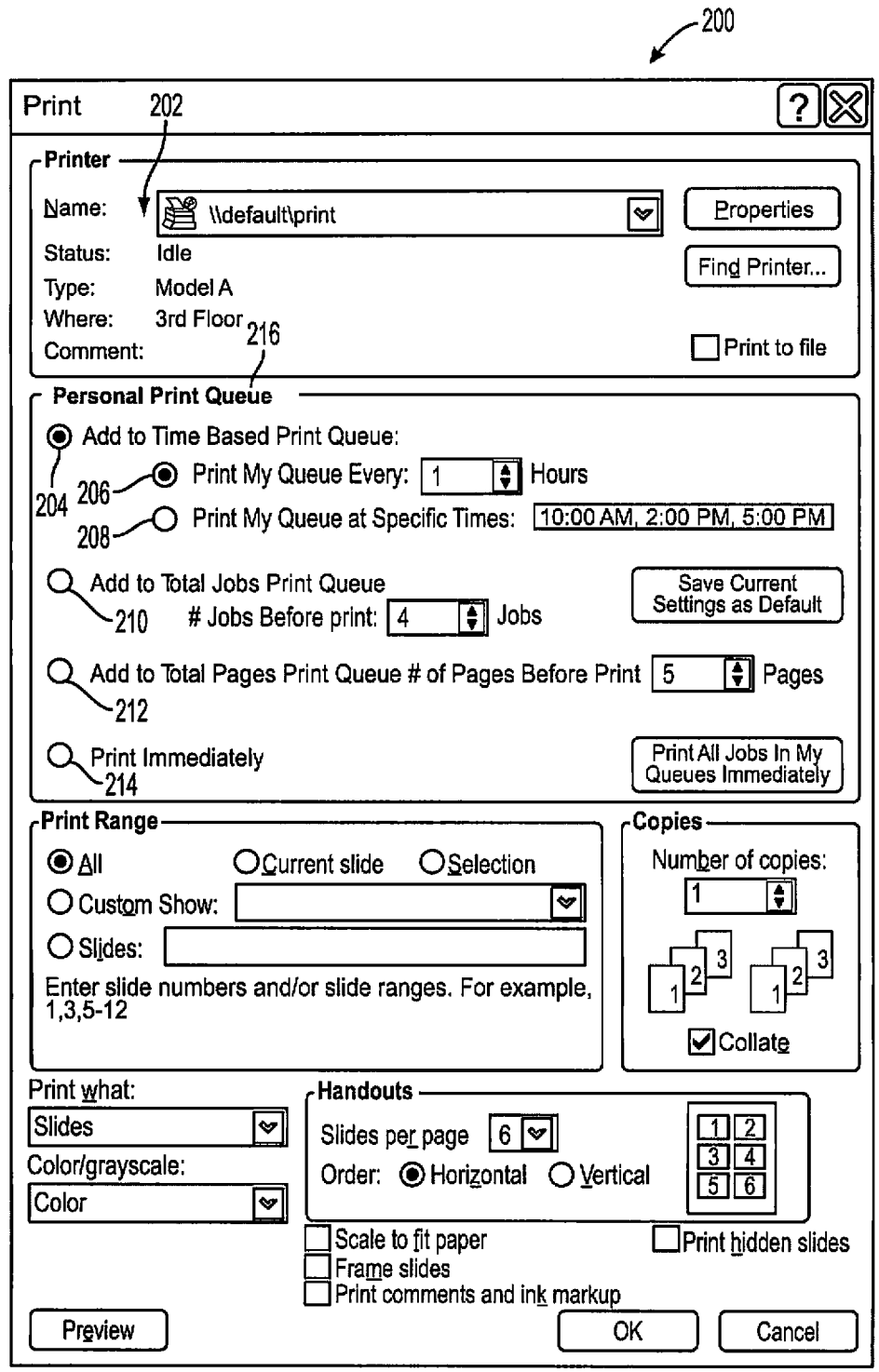
FIG. 2 is a graphic of a graphical user interface for submitting print jobs in accordance with the present disclosure.

Referring to the drawings, FIG. 2 is a graphic of a graphical user interface 200 for submitting print jobs in accordance with the present disclosure. GUI 200 may be GUI 102 of FIG. 1 or is different therefrom. GUI 200 includes a drop-down menu 202 for selecting a printing system and/or a print queue. For example, more than one print queue may be associated with one printing system or each printing system may have one print queue. GUI 200 also includes radio buttons 204-214. GUI 200 is shown as queuing to an identification-based print queue as indication by the "personal print queue" as shown in label 214. In other embodiments, the GUI 200 includes a print queue selection component (not shown) within (or is associated with) GUI 200.

Button 204 selects parameters such that the predetermined condition is a time based print queue which is a type of temporal condition. Button 206 selects parameters to print the queued print jobs every selected number of hours. As shown, the print queue will print every one hour. Button 208 selects parameters such that the print queue is printed at specific time, e.g., 10 a.m., 2 p.m. and 5 p.m., as shown; button 208 selects a type of temporal condition. Button 210 selects parameters such that the print queue is printed when a total number of print jobs are queued in the print queue, e.g., in this example, when four print jobs are queued in the print queue all of the print queued print jobs are printed. Button 212 selects parameters such that the print queue is printed when a total number of pages are queue in the print job; for example, currently GUI 200 is shown with button 212 having a default value of five pages, although button 212 is shown as not being selected.

Button 214 prints the print job or jobs immediately. Button 214 is a type of a "user override selection component" which allows a user to override the parameters 120. Additionally or alternatively, the queued print jobs remain in the queue and are not affected; however, in other embodiments, all or a portion thereof of the queued print jobs are printed when the override selection component is selected to override one or more parameters.

Figure 3:
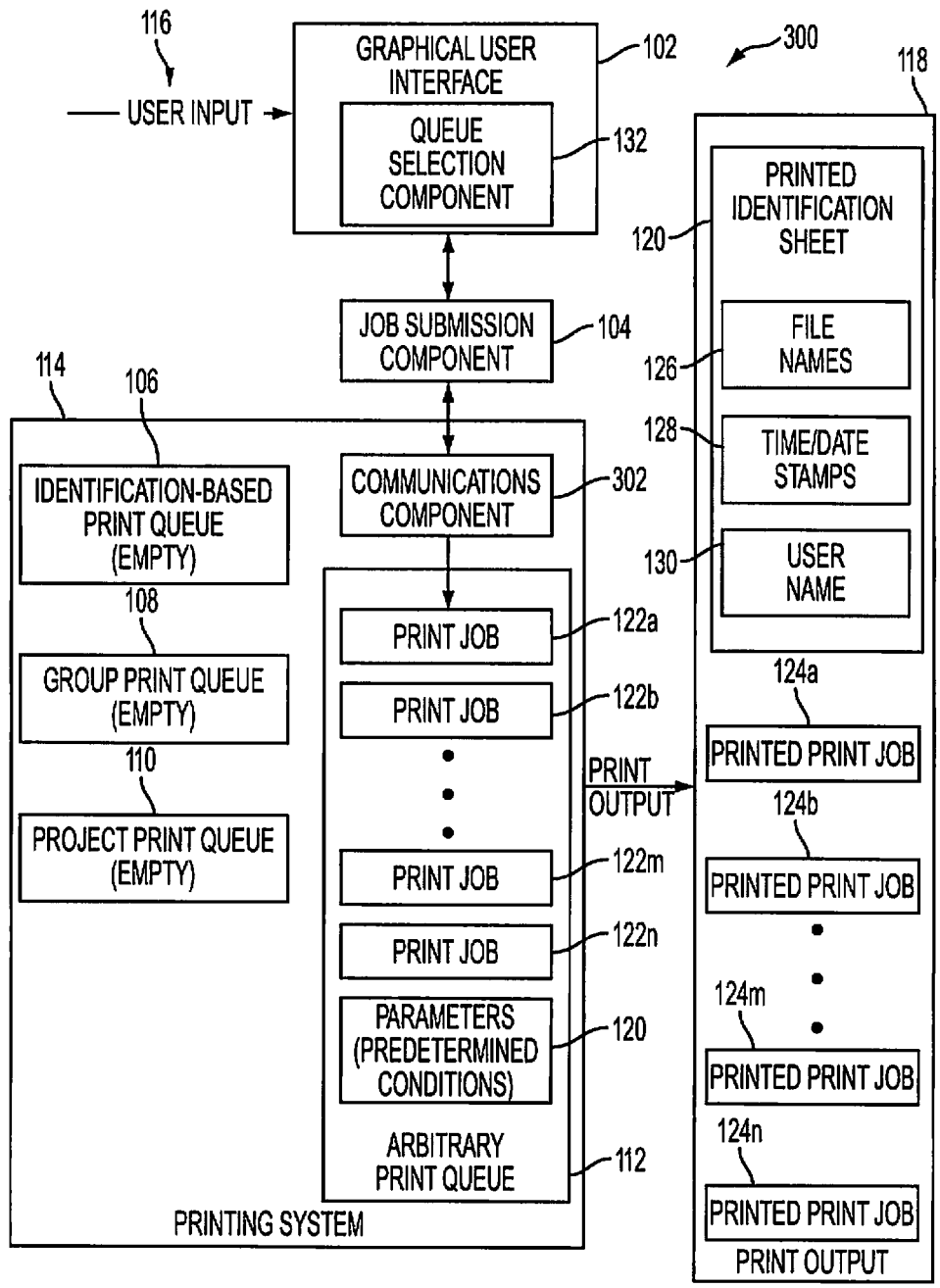
FIG. 3 is a block diagram of another embodiment of a system for printing queued print jobs in accordance with the present disclosure.

Referring to the drawings, FIG. 3 is a block diagram of another embodiment of a system 300 for printing queued print jobs in accordance with the present disclosure. System 300 includes a communications component 302 within printing system 114. Note that printing system 114 receives print jobs from job submission component 104 via communications component 302. The received print jobs are queued by communications component 302, e.g., print jobs 122 are queued within arbitrary print queue 112. Communications component 312 may be a network interface, hardware based, software based and the like. Communications component 312 can direct the received print job received from job submission component 104 to one of queues 106 through 112 either via a default setting, via instruction from user input 116, via data contained within GUI 102 via job submission component 104, and/or the like. Note that queues 106 through 112 are part of printing system 114 within system 300.

GUI 102 and/or job submission component 104 may be part of a personal computer while printing system 114 may be a networked printing system. Queues 106 through 112 are within printing system 114, which is in partial contrast to the embodiment as shown in FIG. 1 in which queues are arbitrarily positioned outside of printing system 114; however, it is the purview of one of ordinary skill in the art for queues 106 through 112 to be partially or wholly within GUI 102, within printing system 114, within a personal computer (not explicitly shown), implemented in any type of hardware or software, and the like. Additionally or alternatively, parameters 120 may be stored within a relevant queue, e.g., parameters 120 are within arbitrary print queue 112. Additional parameters may stored within the printing system 114, within job submission component 104, within GUI 102, and/or implemented in hardware, software and the like.

Similarly to system 100 of FIG. 1, system 300 prints the queued print jobs 122 as printed print jobs 124 when a predetermined condition occurs. The predetermined condition may be a temporal condition, a periodic temporal condition, and/or a threshold number of sheets or print jobs queued in the print queue. Additionally or alternatively, system 300 may have an user override selection component adapted for user selection of immediate printing of a print job, e.g., such as one implemented utilizing button 214 of FIG. 2. Communications component 302, queues 108 through 112, job submission component 104 and/or GUI 102 may in part of wholly form an installable module installable in printing system 114.

Figure 4:
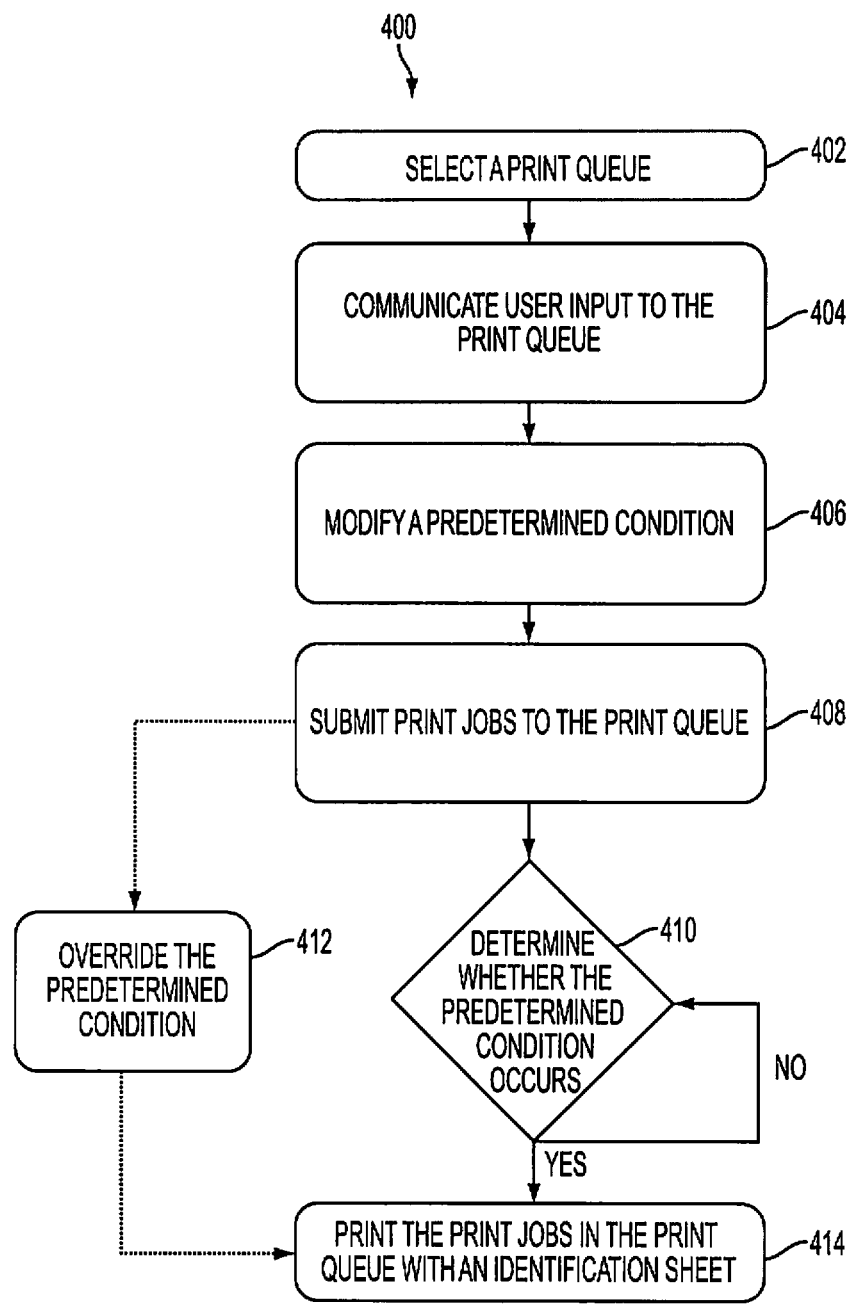
FIG. 4 is a flow chart diagram of a method for printing queued print jobs in accordance with the present disclosure.

Referring to the drawings, FIG. 4 is a flow chart diagram of a method 400 for queuing print jobs in accordance with the present disclosure. Method 400 includes 402 through 414. Method 400 at 402 selects a print queue, e.g., one of an identification-based print queue, a group print queue, a project print queue, and an arbitrary print queue. 404 communicates user input to the print queue. 406 modifies a predetermined condition such as the predetermined condition associated with parameters 120 of FIG. 1 and/or FIG. 3 and described above. 408 submits print jobs to the print queue. 410 determines whether the predetermined condition occurs. If the predetermined condition does not occur, one or more of 402 through 410 may be repeated. Once the predetermined condition occurs and/or at 412 the predetermined condition is overridden, 414 prints the print jobs in the print queue with an identification sheet, e.g., when the predetermined conditions occurs It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for printing queued print jobs identified by a printed identification sheet, comprising:
   a user interface configured to communicate user input;
   a job submission component adapted to submit first and second print jobs to a queue at different times, the job submission component in operative communication with the user interface to receive the user input therefrom,
      wherein the job submission component includes at least one parameter associated with printing the queued print jobs upon occurrence of a predetermined condition,
      wherein the predetermined condition includes at least one of a temporal condition, a periodic temporal condition, a threshold number of sheets and a threshold number of print jobs queued in the print queue, and
      wherein upon the printing of the queued print jobs upon the occurrence of the predetermined condition, the identification sheet comprises a single printed identification sheet for the first and second queued print jobs.

2. The system according to claim 1, wherein the user input modifies the predetermined condition utilizing the user interface.

3. The system according to claim 1, wherein the user input component includes a queue selection component adapted for user selection of the print queue from a plurality of print queues.

4. The system according to claim 1, wherein the print queue includes one of an identification-based print queue, a group print queue, a project print queue, and an arbitrary print queue.

5. The system according to claim 4, wherein the identification-based print queue is associated with the user.

6. The system according to claim 1, wherein the identification sheet has marked thereon at least one of a file name of a print job submitted to the print queue, a time stamp of the print queue, a date stamp of the print queue and a user name.

7. The system according to claim 1, wherein at least one of the user interface and the job submission component is a print driver.

8. The system according to claim 1, wherein the user interface is a graphical user interface.

9. The system according to claim 1, wherein the periodic temporal condition is based upon at least one of a day of a week, a date of a month and a time of the day.

10. The system according to claim 1, wherein the at least one parameter has at least one default setting.

11. The system according to claim 10, wherein the at least one default setting is a function of a day of a week.

12. A method for printing queued print jobs, comprising:
   communicating user input to a print queue;
   submitting at least two print job at disparate times to a same print queue, determining whether a predetermined condition occurs, the predetermined condition includes at least one of a temporal condition, a periodic temporal condition, a threshold number of pages, and a threshold number of print jobs in the print queue; and
   printing all of the print jobs in the queue satisfying the predetermined condition with a single identification sheet when the predetermined condition occurs, wherein the identification sheet reports an entirety of print output for all the printed print jobs.

13. The method according to claim 12, wherein the user input modifies the predetermined condition.

14. The method according to claim 12, further comprising: selecting the print queue from a plurality of print queues.

15. The method according to claim 12, wherein the print queue is one of an identification-based print queue, a group print queue, a project print queue, and an arbitrary print queue.

16. The method according to claim 15, wherein the identification based print queue is associated with the user.

17. The method according to claim 12, wherein the identification sheet has marked thereon at least one of a file name of a print job submitted to the print queue, a time stamp of the print queue, a date stamp of the print queue and a user name.

* * * * *